Patented May 17, 1938

2,117,467

UNITED STATES PATENT OFFICE 2,117,467

POROUS NITER CAKE PELLETS AND METHOD OF MANUFACTURING THE SAME

John F. White, Medford, Mass., assignor, by mesne assignments, to Monsanto Chemical Company, a corporation of Delaware No Drawing. Application March 16, 1937, Serial No. 131,212

8 Claims. (Cl. 23—121)

Niter cake or sodium acid sulphate, is a widely known and utilized chemical of commerce, being formed in methods used for the manufacture of nitric acid through the inter-action of nitrate of soda and sulphuric acid, as expressed by this chemical equation:

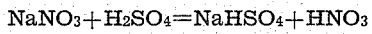

$$NaNO_3 + H_2SO_4 = NaHSO_4 + HNO_3$$

In certain cases and procedures it is made and recovered in processes for the manufacture of muriatic acid, as

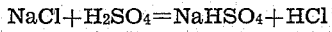

$$NaCl + H_2SO_4 = NaHSO_4 + HCl$$

As produced by these typical reactions the niter cake or sodium bisulphate is discharged from the retort, still, or such equipment in which it is produced, as a molten liquid. Various methods for recovering this molten liquid as a commercial product are recognized. It may be run off in pans and allowed to solidify, the solid mass broken up and marketed as lumps, or subsequently ground up to a powder of any desired degree of fineness. Another method involves a controlled drying and cooling of the molten sodium bisulphate, accompanied with sufficient rotation to discharge a globular or spherical form, with subsequent screening to give uniformity of size. A spray drying process for producing this globular form of niter cake from the fluid or molten bisulphate has also been disclosed.

These globular products, as produced by these various methods, after screening to desired uniform size, are packed in small containers to satisfy a large consumer demand for the chemical in household use. In obtaining the desired uniformity of product, this screening operation yields a considerable amount of fines and oversize, even under the best operating conditions. Furthermore, the true spherical form of the product renders the screening difficult, especially for removing fine material.

These globular products have an apparent density of 1.35–1.40. This high packing weight, in conjunction with the characteristic physical properties of sodium bisulphate, results in an undesirable lumping of the product in the container. This deleterious property can be overcome by the addition of certain foreign materials in varying amounts. Fine products derived from mechanical crushing are very similar in bulk, and also possess this undesirable lumping property.

Modern merchandising methods have demonstrated that a bulky product produces a more favorable consumer reaction, other factors being equal. The increased bulk in further of advantage to the consumer, in that there is less chance for wastage and use of excessive amounts.

For the purpose of preparing a bulkier type of niter cake than those at present known, I have carried out many and varied experiments.

I have discovered that if finely divided niter cake, as mechanically made, or screened from other granulation processes, be maintained at a temperature of 5°–20° C. below the actual melting point for a certain period of time, eight to twelve minutes, the individual particles will agglomerate into clusters of irregular form and shape. By agitating the contents as by rotating the container in which this heat treatment is taking place, formation of large masses is avoided, and a satisfactory amount of product of the desired particle size is obtained. A product made in this way, due to the peculiar formation that results in this method of treatment, has an apparent density of less than 1.0 and usually .85–.95. Methods where globules form from molten niter cake have an apparent density of 1.35–1.45. This method of carefully controlled heating, accompanied by rotation of the mass, has resulted in the formation of a product that has a 50% increase in bulk.

My experiments further demonstrate that if by any manner or means I digress far enough from the necessary temperature conditions so that actual melting of the niter cake occurs in the rotating mass I will produce a mixture of "globular" and "cluster form" material, the relative quantities of each depending on the amount of liquid molten niter cake produced by local or general overheating of the charge. This mixture has a much higher density than the usual "cluster form" product, hence I operate whereby no melting or formation of fluid bisulphate shall take place.

The melting point of pure anhydrous sodium acid sulphate is said to be near 300° C., however the commercial product as discharged from a nitric acid retort has varying amounts of water in combination that depress the melting point greatly. Furthermore, free sulphuric acid may also be present, which has an attendant effect on lowering the melting point. For certain combination the literature has disclosed a minimum melting point as low as 125° C. As a consequence, no definite fixed temperature for carrying out the operation can be specified. This is dependent on the niter-cake. I have found that the maximum output can be obtained by holding the mass at a temperature 10°–15° C. lower than the temperature of true fluidity.

It is true that this compacting of particles into agglomerates or clusters, by agglutination such that non-spherical orbs are obtained, can be made to take place at lower temperatures even 50° C. below the melting point of the bisulphate. The rate of cluster formation at lower temperatures however is so low that the output for a given piece of equipment is far below that required for satisfactory commercial operations.

In carrying out the operation, then, I take precaution to heat the charge just to a point where the mass tends to get fluid, or stick to the walls of the container, then I drop the temperature 5°-10° C. Thus I avoid the formation of molten bisulphate, which as heretofore disclosed tends to form globular products that lower the bulk size of the product.

I have discovered that a product of the maximum bulk is obtained from the mass of clusters formed in the heating operation, by separating and collecting the product which passes through a six mesh screen and remains on a twenty mesh screen.

By proper control of the temperature, to keep closely within the limits specified, and by maintaining this heating period for a period of six to twelve minutes, there will result the maximum production of desired sized material from a given charge to the heater, with the minimum amount of fines and oversize.

I have also discovered that this new and novel form of niter cake, made up as it is of irregular and uneven clusters, rather than uniform spheres as characteristic of globular niter cake, will not lump up, bind, or adhere together, when placed in a container, as is a characteristic of the globular form, unless the latter has added a certain amount of extraneous matter possessing the property of preventing caking or agglutination into dense lumps. Experiments demonstrate that the product may even be exposed to the air without causing this undesirable lumping to take place. Air exposure rapidly accelerates the rate of lumping of globular or very finely divided ground acid sulphate of sodium.

The irregular form thus produced can be screened with appreciably less difficulty than a uniform sphere, since the binding action of wires is much less, resulting in less binding action to a screen, this being especially true when applied to fine screens.

It is thus demonstrated by my experiments, that the new and peculiar form of niter cake which this technique has developed, produces components having appreciably less contacting surface or points with other components, sufficient, in fact, to eliminate the caking property of sodium bisulphate in a form to give maximum contact. This same property is also responsible for the marked increase in bulk.

Following are examples of the methods of producing this new form of niter cake, possessing maximum bulk, and characterized by the absence of deleterious caking or lumping properties when in storage.

*Example I.*—Three hundred (300) pounds of niter cake fines (through 50 mesh) are charged into a cylindrical vessel of iron construction, mounted and connected to a suitable drive so that it may be rotated along the horizontal axis at a moderate speed, 4-10 R. P. M. One end of the cylinder may be closed, or both ends may be open, at will; the open end or ends having an inner flange or build-up to maintain the charge in the heater without spillage. A tilting arrangement is provided to permit dumping the batch when finished. The apparatus may be lagged for increased thermal and operating efficiency. A suitable burner or combustion apparatus is provided for furnishing the necessary heat input. It is placed in front of the open end of the rotating cylinder at an elevation such that the flame plays over the surface of the niter cake yet does not impinge on it. Transfer of heat is made from the hot gases as well as heat stored up in the shell during the rotation. The charge is heated up rapidly to a point where the first sign of molten niter cake appears, when the temperature is cut 5°-20° C., and the batch maintained at this temperature for eight to twelve minutes. Once having determined the melting point for a given lot of niter cake, I am careful to heat up only to the required temperature, as specified 5°-20° C., below this point. At the end of the heating period the flame is shut off, and the charge cooled while rotating for three to five minutes. The cylinder is then tilted to discharge the product to conveying equipment to standard screens where I collect the product passing through a six mesh screen, but remaining on a twenty mesh screen. The fine partially agglomerated material is returned to some subsequent batch in the heating cylinder.

*Example II.*—The mechanical equipment for carrying out this process continuously consists of any of the well known types of rotary driers or calcining kilns. Hot gases from any desired source of combustion are passed in a direction countercurrent to the flow of niter cake fines. The niter cake fines are introduced into the charging end of the rotary calciner at a uniform rate, and as a result of the rotation and pitch of the drier flow downwardly and countercurrent with respect to the flow of hot gases from the combustion chamber or dutch oven. The temperature gradient and rate of solid material flow through the heating chamber is so adjusted that the bisulphate of soda will remain at a temperature 5°-20° C. below its melting point for a period of eight to twelve minutes prior to discharging from the furnace. The temperature is carefully controlled to prevent any substantial melting of the material. The continuously discharged agglomerated product passes through a rotary cylinder where it is cooled down sufficiently to firmly "set" all sticky joints into agglomerated clusters. Standard screens then segregate the six to twenty mesh product, the fine material being returned to the calciner.

I do not limit myself to any particular type or design of equipment to attain the desired ends. Wide variations in the apparatus are permissible to obtain the results by heating niter cake to a temperature as high as 5°-20° C. below its actual melting point, and thus stick small particles together into irregular lumps or clusters that do not possess the even spherical form which would cut down the packing bulk and rapid solubility. I do not necessarily require rotation for this purpose, this being applied merely to avoid formation of too large and extended clusters. The same effect can be obtained by shaking or giving a horizontal to-and-fro motion to the heated mass.

I also do not limit myself to any particular source of niter cake fines. I may use any product that will pass through a twenty mesh screen, whether derived from mechanical grindings, granulation, or other processes wherein fine niter cake is obtained.

What I claim is:

1. The method which comprises subjecting relatively finely divided niter cake to agitation while heating at a temperature sufficiently elevated to cause agglomeration of the said relatively finely divided niter cake but said temperature being below the melting point of said niter cake and continuing at said temperature, until the particles become agglomerated, and subsequently separating pellets of the desired size from the mixture.

2. The method of making pellets of niter cake which are substantially non-caking, free flowing and relatively non-hygroscopic, characterized in that relatively finely divided particles of niter cake which possess the normal hygroscopic property of niter cake and which also possess a tendency to form lumps or cakes under normal conditions of handling and use are heated to a temperature below the melting point of the niter cake but not substantially more than 50° C. below said melting point until agglomeration of the particles into relatively larger porous agglomerates or clusters is effected, whereby the normal hygroscopic property of the niter cake and tendency to lump is reduced, and subsequently classifying the material into pellets of the desired size.

3. The method of forming porous, substantially non-caking pellets of niter cake comprising heating relatively finely divided niter cake whilst agitating it to a temperature 5°–20° C. below that at which it melts and maintaining it within said temperature range for a period of from six to twelve minutes whereby said porous substantially non-caking pellets of niter cake are formed and separating pellets of the desired size from the mixture.

4. The method as defined in claim 1 and further characterized in that the heating and agitation is continued until the niter cake pellets formed have an apparent density of less than 1.0 and then separating the said agglomerates of the desired size from the remainder of the mass.

5. The method of producing porous, substantially non-caking pellets of niter cake comprising heating relatively finely divided niter cake to a temperature below that at which it melts but not more than 50° C. below its melting point and maintaining it within this temperature range until agglomerates of the desired size are formed and then separating the said agglomerates of the desired size from the remainder of the mass.

6. A method as defined in claim 5 and further characterized in that the heating is continued until the niter cake pellets formed have an apparent density of .85–.95.

7. As an article of manufacture a mass or body of discreet pellets of niter cake of relatively large size and irregular shape, said pellets being porous agglomerates of relatively small particles of niter cake bonded together by means of niter cake material solidified from a viscous molten state and characterized further by possessing substantially permanent free-flowing properties and freedom from the tendency to form lumps or cakes under normal conditions of handling and use.

8. As an article of manufacture a mass or body of discreet pellets of niter cake of relatively large size and irregular shape, said pellets being porous agglomerates of relatively small particles of niter cake bonded together by means of niter cake material solidified from a viscous molten state, the said mass or body of niter cake pellets having an apparent density of less than about 1.0 and characterized further by possessing substantially permanent free-flowing properties and freedom from the tendency to form lumps or cakes under normal conditions of handling and use.

JOHN F. WHITE.